Sept. 19, 1967   D. L. PETERS   3,342,916
METHOD AND APPARATUS FOR BLOW MOLDING HOLLOW ARTICLES
Filed May 4, 1965   5 Sheets-Sheet 1

INVENTOR
D. L. PETERS
BY
ATTORNEYS

INVENTOR
D. L. PETERS
BY
ATTORNEYS

Sept. 19, 1967     D. L. PETERS     3,342,916
METHOD AND APPARATUS FOR BLOW MOLDING HOLLOW ARTICLES
Filed May 4, 1965     5 Sheets-Sheet 4

INVENTOR
D. L. PETERS
BY
ATTORNEYS

Sept. 19, 1967   D. L. PETERS   3,342,916
METHOD AND APPARATUS FOR BLOW MOLDING HOLLOW ARTICLES
Filed May 4, 1965   5 Sheets-Sheet 5

INVENTOR
D. L. PETERS
BY
ATTORNEYS

United States Patent Office 3,342,916
Patented Sept. 19, 1967

3,342,916
METHOD AND APPARATUS FOR BLOW MOLDING HOLLOW ARTICLES
Donald L. Peters, Bartlesville, Okla., assignor to Phillips Petroleum Company, a corporation of Delaware
Filed May 4, 1965, Ser. No. 452,997
8 Claims. (Cl. 264—98)

This invention relates to blow molded hollow articles. In one of its aspects it relates to a method for blow molding hollow articles in which a partially blown heated hollow parison is placed in a mold, severed to form a hollow chamber, a minor chamber is formed within said hollow chamber, and the article is blown by introducing fluid pressure into the chambers through the minor chamber. In another of its aspects, the invention relates to a method for forming a hollow thermoplastic article having an integral hollow handle, the method comprising introducing a heated hollow parison into a hollow mold cavity, pinching out an area in said hollow parison to form a hollow handle portion and a body portion integrally connected and a satellite portion leaving an opening between the pinched out satellite portion and the hollow handle portion, introducing fluid pressure into the pinched out satellite portion so that the fluid pressure flows through the satellite portion into the handle portion and body of the parison to cause the parison to expand to conform with the shape of the mold cavity. In another of its aspects, the invention relates to an apparatus for blow molding a hollow article having an integral hollow handle, the apparatus containing mold halves having a hollow cavity, one mold half containing a pair of slidable cores to slide at right angles to the direction of movement of the mold halves, the slidable cores adapted to pinch out a portion of a parison introduced into the mold cavity to form a minor hollow chamber within the parison, one of the slidable cores containing a blowing needle to puncture the minor hollow chamber and a pipe for introducing fluid pressure into the needle.

Blow molding plastic articles such as bottles and the like presents no problem with regard to placement of a blowing pin. The blowing pin can be introduced into the neck of the bottle and need not pierce the parison. When hollow articles having substantially no openings are formed, a blowing needle penetrates the surface of the parison and leaves an undesirable mark thereon. A blow molded hollow ball, for example, would have a blowing needle mark on the its outer surface.

In copending application Ser. No. 452,996, filed May 4, 1965, there is described and claimed a method and apparatus for forming a hollow object having an integral hollow handle. In said application, a pair of slidable mold cores pinch out an area in a partially blown parison, thus forming a minor hollow chamber within a major chamber. It has now been discovered that the hollow object can be blown by leaving a passage between the minor chamber and major chamber, and introducing fluid pressure into the minor chamber. By so doing, the undesirable appearance of a needle hole or blow pin hole in the blown object can be avoided.

By various aspects of this invention, one or more of the following, or other, objects can be obtained.

It is an object of this invention to produce a blow molded hollow object having an integral hollow handle.

It is a further object of this invention to produce a hollow blow molded article in which no apparent blow molding needle or blowing pin hole is present.

It is a further object of this invention to provide an apparatus for blow molding a hollow object having an integral hollow handle in which there are no apparent blow molding needle or blowing pin holes.

Other aspects, objects, and the several advantages of this invention are apparent to one skilled in the art from a study of this disclosure, the drawings and the appended claims.

According to the invention, a hollow article is blow molded by introducing a heated parison into a pair of mold halves, pinching out a minor satellite chamber within the parison, and blowing the object through the satellite chamber. In pinching out the satellite chamber, communications will be maintained between the satellite chamber and a major chamber of the parison. The satellite chamber can be removed after the blow molding operation.

Further according to the invention, a hollow article having an integrally molded hollow handle is produced by introducing a heated hollow parison into a pair of mold halves. The mold halves pinch off the heated parison to form a hollow parison being closed at both ends within the mold halves. A pair of slidable cores pinch out an area within the hollow parison, thus forming a hollow chamber within the main parison chamber. Small openings are left between the pinched out area and the main chamber to provide for fluid flow between the two chambers. A needle punctures the pinched out chamber and introduces fluid pressure therein to cause the parison to expand. The fluid pressure flows through the pinched out chamber and into the main parison chamber. After the blowing operation, the pinched out segment can be separated from the main body.

The invention can be better understood by reference to the accompanying drawings in which.

Figure 4:
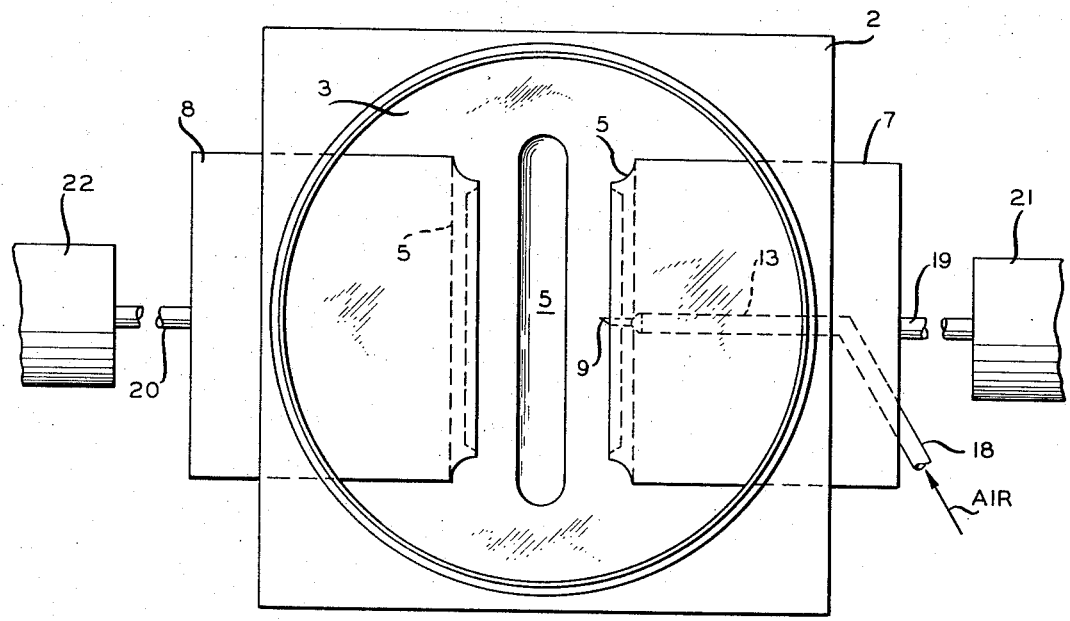
FIGURE 4 is a cross section along lines IV—IV of FIGURE 1 showing a view of a mold half according to the invention.
Figure 5:
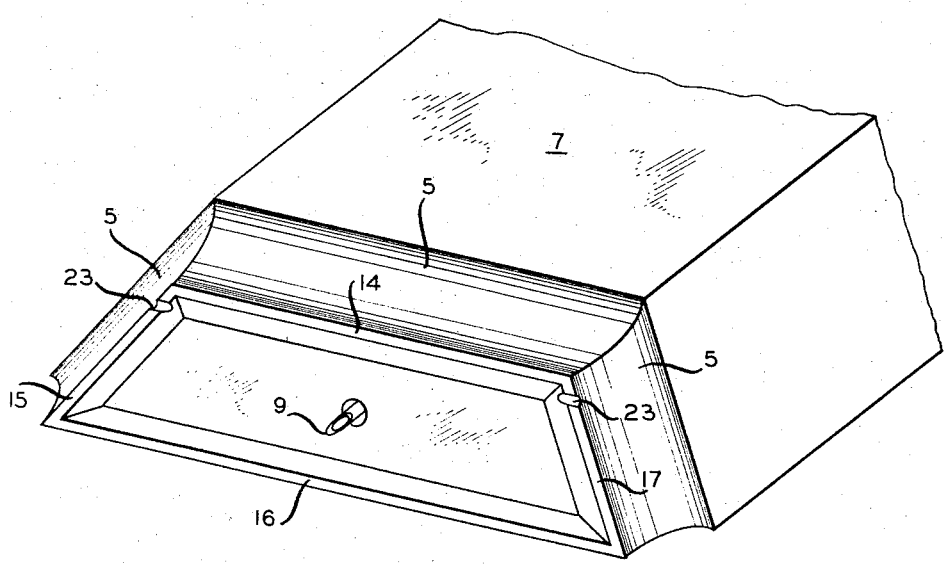
FIGURE 5 is an axonometric end view of a slidable core.

Referring now to the drawings, mold halves 1 and 2 are provided with mold cavity 3 having a main cavity 4, a handle cavity 5, and a satellite cavity 6 within handle cavity 5. Mold half 2 contains two slidable cores 7 and 8 which move in a direction perpendicular to the direction of movement of the mold halves. Suitable means for actuating movement of cores 7 and 8 can be provided as shown in FIGURE 4. Rods 19 and 20, actuated by air cylinders 21 and 22, serve as the actuation means for cores 7 and 8. Core 7 has protruding jaws 14, 15, 16 and 17 as shown in FIGURE 5 which, when brought together, cooperate with similar jaws on core 8 to form satellite cavity 6. Positioned within satellite cavity 6 and attached to core 7 is blow molding needle 9. Air channel 13 supplies fluid pressure from air hose 18 to needle 9. The opening between the pinched out satellite portion and the hollow handle portion is formed by channels 23 in the jaws 15 and 17 of the cores which pinch out the satellite chamber. Generally, this opening will be formed as said cores come together. In some instances, the two sides of the parison may come together forming a weak web over this channel. If so, the high pressure blowing air will rupture this web to form the channel.

Figure 6:
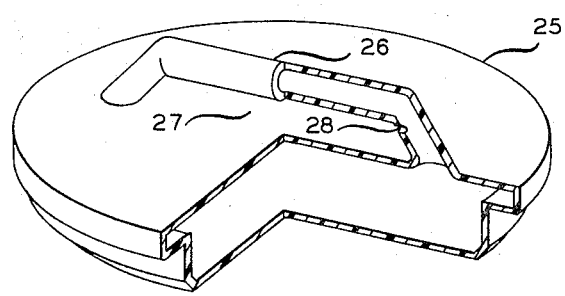
FIGURE 6 is an axonometric view in partial section of an article produced according to the invention.

Referring now to FIGURE 6, hollow object 25 having an integrally formed hollow handle 26 and a handle opening 27 can be formed by the process and apparatus of the invention. As can be seen from the drawing, the hollow handle has a passage which is communicable with the main body of the hollow object. The object shown in FIGURE 6 is a hollow water cooler cover. However, it is obvious that other hollow objects having an integrally molded hollow handle and other objects having a pinched out portion can be formed according to the method and apparatus of the invention.

Figure 1:
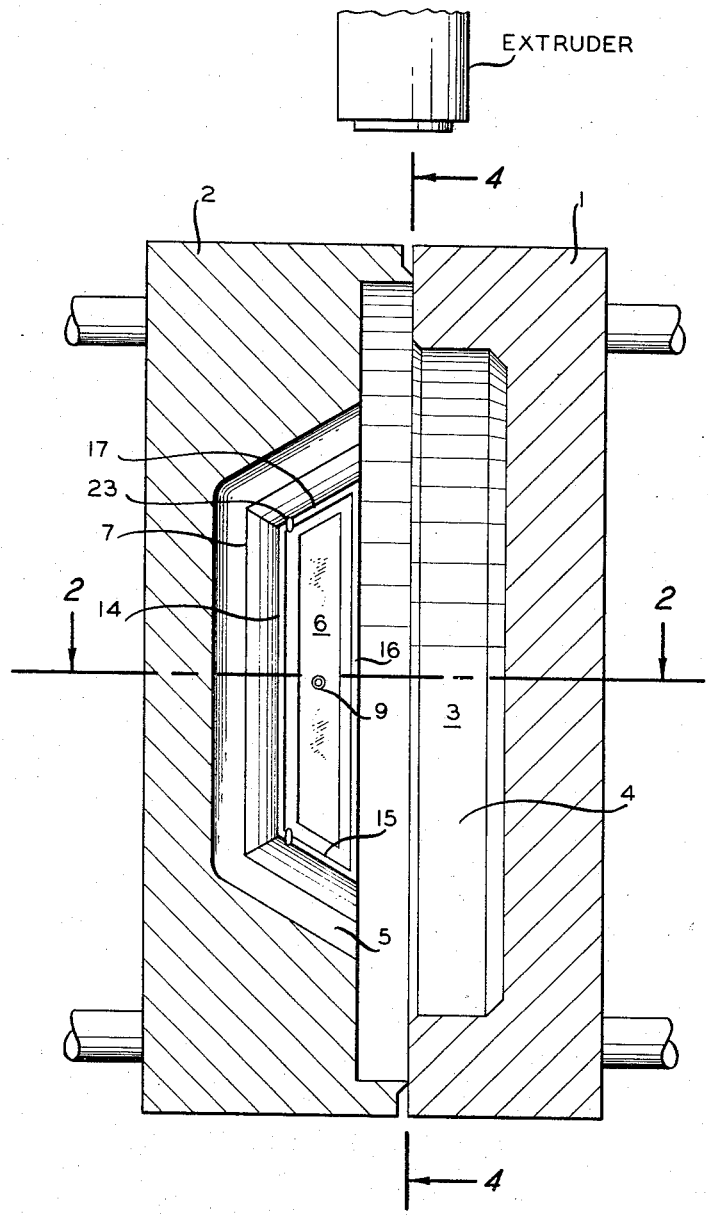
FIGURE 1 is a cross section through the two mold halves showing one view of the internal cavity.
Figure 2:
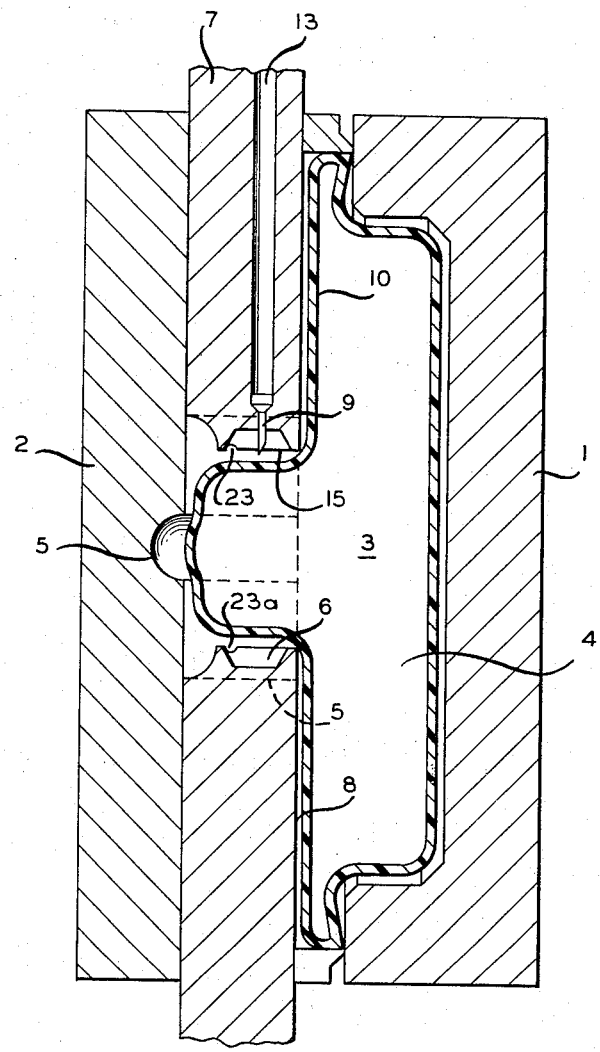
FIGURE 2 is a cross section through II—II of FIGURE 1 showing the slidable cores in open position prior to the blowing operation.
Figure 3:
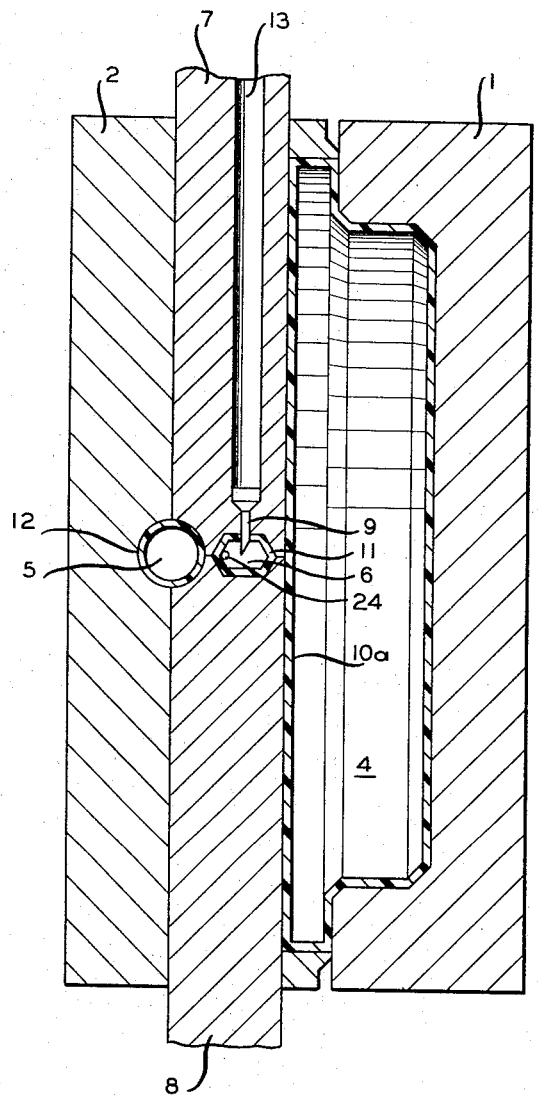
FIGURE 3 is a view similar to FIGURE 2 at a later stage in the operation, showing the cores in the closed position.

In operation, a heated parison is introduced into mold halves 1 and 2. The parison is pinched off by the closing of molds 1 and 2, thus forming a hollow chamber which roughly conforms to the shape of the mold cavity 3. It is desirable to use a parison which has been partially blown so that a portion of the parison 10 will occupy handle cavity 5. At this stage in the operation, the movable cores 7 and 8 are withdrawn as shown in FIGURE 2. The mold cores 7 and 8 are then actuated to pinch out handle portion 12 and satellite portion 11, as shown in FIGURE 3. Needle 9 punctures satellite portion 11. Small passages 24 are left between satellite portion 11 and handle portion 12 which is communicable with the main chamber 10a; the small passages can be left by providing the slidable cores with cut out corners 23 on edges 15 and 17 of core 7 and cut out corners 23a on the corresponding edges of core 8 as shown in FIGURES 2, 3, and 5. The passages can be formed at any junction between the handle portion 12 and the satellite portion 11 or between the main body 10a and the satellite portion 11. The preferred positions of the passages are as shown in FIGURE 5, formed at the corners of jaws 15 and 17 in sliding core 7 and the corresponding jaws at core 8. In this manner, the passages 24 between the satellite portion and the handle portion will be formed in the corners of the hollow handle 26, thus leaving hole 28 in the under side of the handle as shown in FIGURE 6. The openings will be substantially unnoticeable in normal operation of the blown object. As can be seen from FIGURES 1, 2 and 3, the satellite chamber 11 is surrounded by the main portion of parison 10 in the plane of FIGURE 1. Thus the satellite chamber 11 is spaced from the walls of mold cavity 3. Air pressure is then introduced through lines 18, air channel 13 and into needle 9. The air pressure expands satellite chamber 11 and forces the pressure through the openings between satellite chamber 11 and handle 12 and expands handle portion 12. The air pressure also passes through handle portion 12 into the main portion 10a of the hollow parison, thus forcing the parison against the sides of the mold, forming the object. After the blown parison has cooled, core member 7 and 8 are retracted, mold halves 1 and 2 are opened, and the object removed. The satellite chamber 11 being attached to the object at only one or two places, it can be easily severed from the object.

The thermoplastic material used for the blowing operation can be any suitable thermoplastic material such as polyethylene, polypropylene, polybutene, and copolymers thereof, polystyrene, polyvinyl alcohol, polyvinyl chloride, and the like.

It is within the scope of the invention to carry out the method by vacuum molding the object. In such a case, the vacuum draw elements would be provided in the walls of the mold halves 1 and 2. When vacuum is applied, air would be introduced through air channel 13, needle 9, through satellite chamber 11 and into handle portion 12 and main chamber 10a of the parison.

It is within the scope of the invention to use, in place of sliding cores 7 and 8, a single sliding core which is adapted to pinch out a satellite chamber and blow the object through said chamber. In such a case, the single core would be similar to core 7, but would have a deeper cavity for pinching out the satellite portion. In operation, the single core would slide completely across the handle cavity 5 instead of only half way across as above described in connection with the drawings. Similarly, three or more cores could be used to produce a triangular-shaped handle, for instance.

It can be seen from the drawings that the sliding core or cores operate in a direction at right angles to the direction of movement of the mold halves and in a plane of separation of the mold halves. It is to be understood that the sliding cores are not restricted to movement in the plane of separation of the mold halves. The direction of movement of the sliding core member or members can be at any angle to the plane of separation of the mold halves and can even be perpendicular to the plane of separation of the mold halves.

It is to be understood further that the parison can be partially blown when placed in the mold cavity or can be pre-blown after being placed in the mold cavity and before activation of slidable core member or members. However, it is obvious from this disclosure that it is preferable to have some trapped fluid in the parison before the pinch out operation. Otherwise, the parison may not sufficiently conform to the mold cavity to allow a portion thereof to be pinched out for the handle.

Reasonable variation and modification are possible within the scope of the foregoing disclosure, drawings and the appended claims to the invention, the essence of which is that a hollow object with an integrally formed hollow handle is made by pinching out from a partially blown hollow parison a satellite cavity into which air pressure is introduced, the air pressure passing from the satellite cavity and into the main portion of the hollow parison to blow the hollow parison into a suitable shape.

I claim:

1. In a blow molding operation wherein a closed hollow parison is positioned in a hollow mold and a portion of the parison is pinched out to form a satellite chamber within a main chamber of said parison, said satellite chamber being surrounded by the remainder of said parison in at least one plane containing said parison and said satellite chamber, the improvement which comprises puncturing said satellite chamber with a blowing needle, then forcing air through said blowing needle into said satellite chamber and through said satellite chamber into the main portion of said parison to blow said parison to conform to said mold.

2. A method for blow molding a hollow object containing a hollow channel communicable with a main chamber, said method comprising positioning a heated partially blown hollow parison in a pair of mold halves, closing said mold halves to pinch off said parison, thus forming a main chamber, then pinching out within said main chamber a minor chamber, said minor chamber being surrounded by said main chamber and said minor chamber, forming openings between said minor chamber and said main chamber, then introducing fluid pressure into said minor chamber at such pressure that the fluid pressure passes from said minor chamber through said openings into said main chamber to expand said chamber to conform to said mold form.

3. A method according to claim 2 wherein the blown object is cooled and the minor chamber is severed from the main chamber.

4. A method for blow molding a hollow object containing a hollow channel communicable with a main chamber, said method comprising positioning a heated partially blow hollow closed parison in a pair of mold halves, closing said mold halves, pinching out within said parison a minor chamber, said minor chamber being surrounded by the remainder of said parison in at least one plane containing said parison and said minor chamber, forming a hollow channel in said parison communicable with said parison, and forming openings between said minor chamber and said parison, then introducing fluid pressure into said minor chamber, allowing the fluid pressure to pass from said minor chamber through said openings into said parison to expand said parison to conform to said mold form.

5. An apparatus for blow molding a hollow article having a portion thereof pinched out, said apparatus comprising a pair of mold halves forming a main cavity portion, at least one mold half containing a cavity-formed means for forming a second smaller cavity within said main cavity, said smaller cavity being spaced from the walls of said main cavity portion such that when a partially blown parison is placed within said main cavity portion said cavity-forming means pinches out a smaller chamber within said main chamber, passage-forming means in said cavity-forming means for maintaining communication between said main cavity and said second smaller cavity, and fluid pressure introducing means in said cavity-forming means for expanding a parison in said main cavity portion through said smaller cavity.

6. An apparatus according to claim 5 wherein said cavity-forming means comprises a pair of slidable mold inserts which slide at right angles to a plane separation of said mold halves, each mold insert having recessed portions to form said second smaller cavity.

7. An apparatus according to claim 6 wherein one of said slidable mold inserts contains a blowing needle which punctures the smaller cavity of said partially blown parison, said one of said slidable mold inserts containing means for introducing air under pressure through said needle into said smaller cavity.

8. An apparatus according to claim 5 wherein said mold halves are provided with a means to draw a vacuum between said parison and said mold in said main cavity.

References Cited

UNITED STATES PATENTS

| | | | |
|---|---|---|---|
| 2,541,249 | 2/1951 | Hobson | 264—98 X |
| 2,991,500 | 7/1961 | Hagen | 264—98 X |
| 3,012,286 | 12/1961 | Gasmire | 264—97 |
| 3,048,891 | 8/1962 | Maass. | |
| 3,120,679 | 7/1964 | Price et al. | |

FOREIGN PATENTS

| | | |
|---|---|---|
| 220,099 | 2/1959 | Australia. |
| 688,997 | 3/1953 | Great Britain. |
| 856,523 | 12/1960 | Great Britain. |

ROBERT F. WHITE, *Primary Examiner.*

A. R. NOE, *Assistant Examiner.*